US011367305B2

(12) United States Patent
Tajbakhsh et al.

(10) Patent No.: US 11,367,305 B2
(45) Date of Patent: Jun. 21, 2022

(54) OBSTRUCTION DETECTION DURING FACIAL RECOGNITION PROCESSES

(71) Applicant: Apple Inc., Cupertino, CA (US)

(72) Inventors: Touraj Tajbakhsh, San Jose, CA (US); Jonathan Pokrass, Herzliya (IL); Feng Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 16/549,009

(22) Filed: Aug. 23, 2019

(65) Prior Publication Data

US 2020/0104567 A1 Apr. 2, 2020

Related U.S. Application Data

(60) Provisional application No. 62/738,160, filed on Sep. 28, 2018.

(51) Int. Cl.
*G06V 40/16* (2022.01)
*G06K 9/62* (2022.01)

(52) U.S. Cl.
CPC ......... *G06V 40/165* (2022.01); *G06K 9/6269* (2013.01); *G06V 40/169* (2022.01); *G06V 40/172* (2022.01)

(58) Field of Classification Search
CPC ........... G06K 9/00248; G06K 9/00228; G06K 9/00241; G06K 9/00255; G06K 9/00268; G06K 9/00275; G06K 9/00288; G06K 9/00281; G06K 9/00295; G06K 9/00302; G06K 9/00308; G06K 9/00315; G06K 9/6269; G06T 7/593; G06T 7/10028; H04N 5/2256; G06V 10/143; G06V 10/98

(Continued)

(56) References Cited

U.S. PATENT DOCUMENTS 7,602,942 B2 * 10/2009 Bazakos ............ G06K 9/00255
209/577
9,177,130 B2 11/2015 Nechyba et al.
(Continued)

OTHER PUBLICATIONS

Wang, Zhongyuan & Wang, Guangcheng & Huang, Baojin & Xiong, Zhangyang & Hong, Qi & Wu, Hao & Yi, Peng & Jiang, Kui & Wang, Nanxi & Pei, Yingjiao & Chen, Heling & Yu, Miao & Huang, Zhibing & Liang, Jinbi. (2020). Masked Face Recognition Dataset and Application. (Year: 2020).*

*Primary Examiner* — Andrew M Moyer
*Assistant Examiner* — Stephen M Brinich
(74) *Attorney, Agent, or Firm* — Kowert, Hood, Munyon, Rankin & Goetzel, P.C.; Gareth M. Sampson

(57) ABSTRACT

A facial recognition process operating on a device may include one or more processes that determine if a camera and/or components associated with the camera are obstructed by an object (e.g., a user's hand or fingers). Obstruction of the device may be assessed using flood infrared illumination images when a user's face is not able to be detected by a face detection process operating on the device. Obstruction of the device may also be assessed using a pattern detection process that operates after the user's face is detected by the face detection process. When obstruction of the device is detected, the device may provide a notification to the user that the device (e.g., the camera and/or an illuminator) is obstructed and that the obstruction should be removed for the facial recognition process to operate correctly.

18 Claims, 8 Drawing Sheets

(58) Field of Classification Search
USPC .................................. 382/115–118, 103, 100
See application file for complete search history.

(56) References Cited

U.S. PATENT DOCUMENTS

| | | | |
|---|---|---|---|
| 10,303,866 B1* | 5/2019 | Van Os | G06K 9/00268 |
| 10,769,415 B1* | 9/2020 | Mostafa | G06K 9/036 |
| 2008/0319640 A1* | 12/2008 | Fujita | G01C 21/3476 |
| | | | 701/439 |
| 2011/0026849 A1* | 2/2011 | Kameyama | G06K 9/00308 |
| | | | 382/260 |
| 2011/0110564 A1* | 5/2011 | Tabe | G06K 9/00221 |
| | | | 382/118 |
| 2014/0270370 A1* | 9/2014 | Saito | G06K 9/00288 |
| | | | 382/103 |
| 2015/0288866 A1* | 10/2015 | Barsoum | H04N 5/23293 |
| | | | 348/164 |
| 2016/0063033 A1 | 3/2016 | Park et al. | |
| 2017/0070680 A1 | 9/2017 | Kobayashi | |
| 2017/0286752 A1* | 10/2017 | Gusarov | G06K 9/00248 |
| 2018/0005420 A1* | 1/2018 | Bondich | G06K 9/00288 |
| 2018/0196998 A1* | 7/2018 | Price | G06K 9/00255 |
| 2018/0211101 A1 | 7/2018 | Ahmed | |
| 2019/0370533 A1* | 12/2019 | Han | G06K 9/00281 |
| 2019/0377856 A1* | 12/2019 | Zhang | G06F 21/32 |

* cited by examiner

OBSTRUCTION DETECTION DURING FACIAL RECOGNITION PROCESSES

PRIORITY CLAIM

This patent claims priority to U.S. Provisional Patent Application No. 62/738,160 to Tajbakhsh et al., entitled "OBSTRUCTION DETECTION DURING FACIAL RECOGNITION PROCESSES", filed Sep. 28, 2018, which is incorporated by reference in their entirety.

BACKGROUND

1. Technical Field

Embodiments described herein relate to methods and systems for obstruction detection during facial recognition processing using images captured by a camera on a device. More particularly, embodiments described herein relate to detection of camera obstruction and/or illuminator obstruction and providing notification to the user of the obstruction.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, there may be times when a user inadvertently obstructs or blocks a camera from having a clear view of the user's face. The user may also inadvertently obstruct or block an illuminator from providing proper illumination of the user's face. With either the camera or the illuminator obstructed, a facial recognition process may have difficulty in authenticating the user and the features available for authentication (e.g., facial features) may be limited. Without a notification being provided that the camera and/or illuminator is obstructed, the user may not realize that there is a problem and become frustrated with his/her experience in trying to unlock the device using facial recognition.

SUMMARY

In certain embodiments, a facial recognition process operating on a device includes a camera obstruction detection process and/or a pattern detection process. The camera obstruction process may be used to determine if an object (e.g., a user's hand or fingers) is obstructing (e.g., blocking) the camera from viewing the user's face when the face is not detected during the facial recognition process. If the camera obstruction process determines that an object is blocking the camera, the device may provide a notification to the user that the device (e.g., the camera) is obstructed. The pattern detection process may be used to determine if a projector (e.g., an illuminator) on the device is obstructed or blocked by an object after the user's face is detected during the facial recognition process. For example, the pattern detection process may be used to determine if a pattern illuminator is obstructed or blocked by the object before the facial recognition process continues. If the pattern detection process determines that the pattern illuminator is obstructed, the device may provide a notification to the user that the device (e.g., the illuminator) is obstructed. If the pattern detection process determines that the pattern illuminator is not obstructed, the facial recognition process may continue with an authentication process (e.g., a facial recognition authentication process).

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
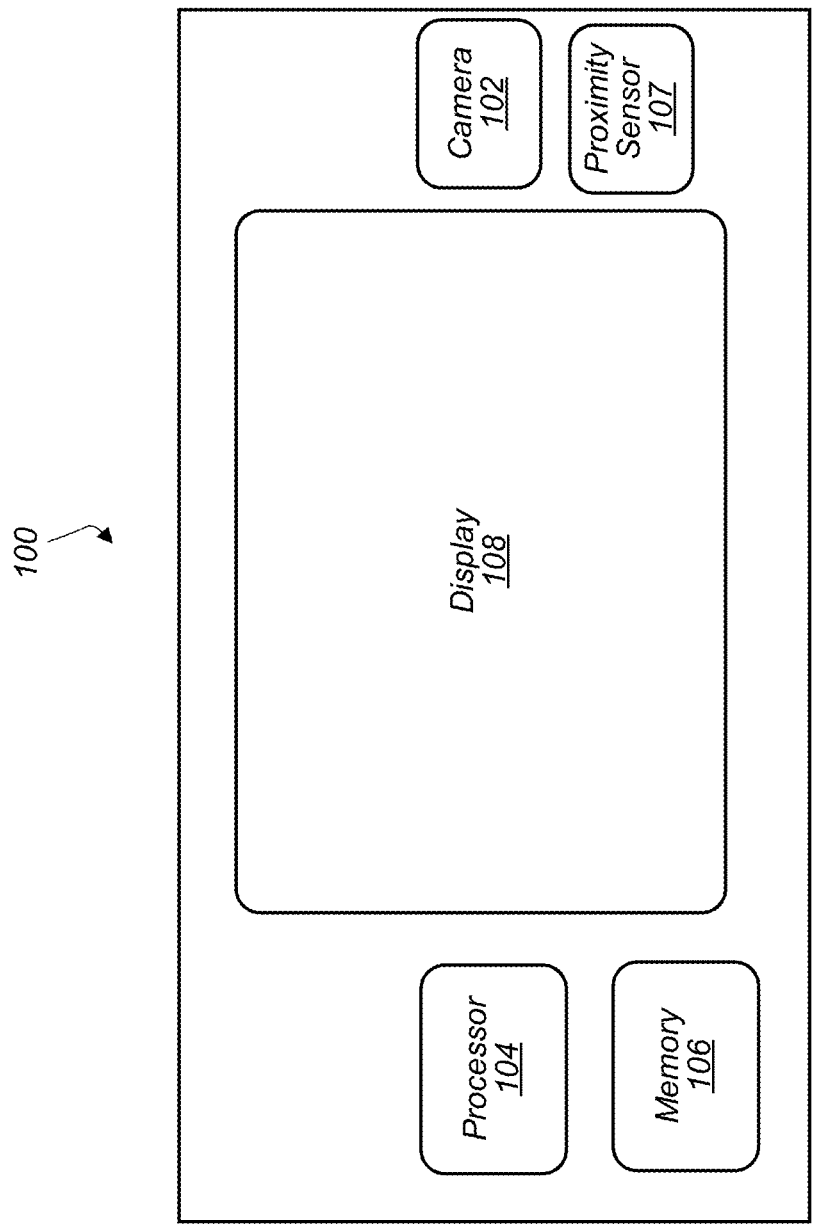
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
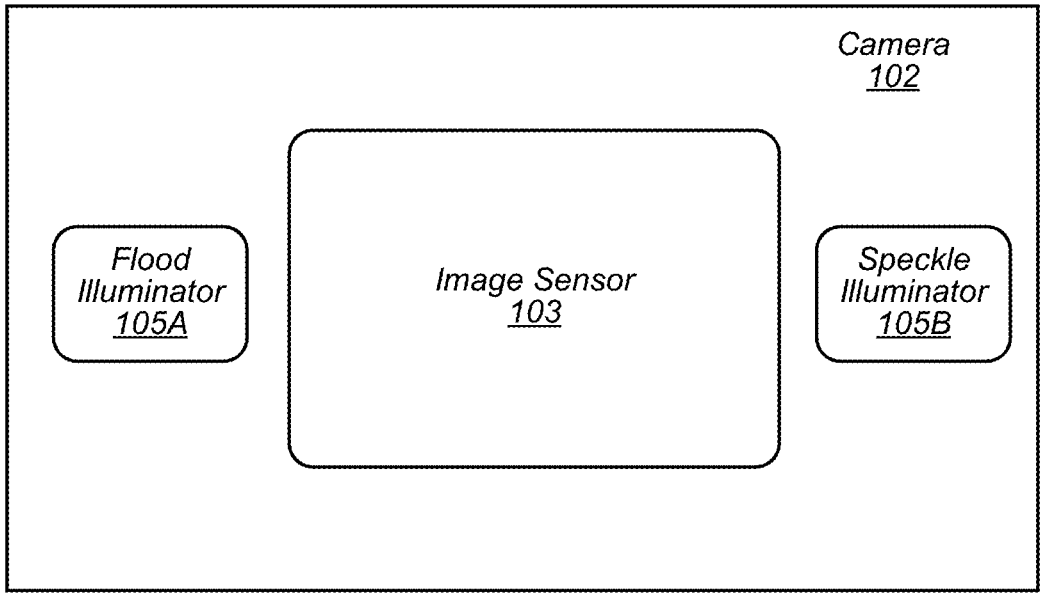
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection and/or facial recognition authentication, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

Depth information may be captured using any suitable depth imaging system, examples of which include structured light and time of flight systems. In some instances, the depth imaging system may utilize an illuminator in providing depth detection or generating a depth map image. For example, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
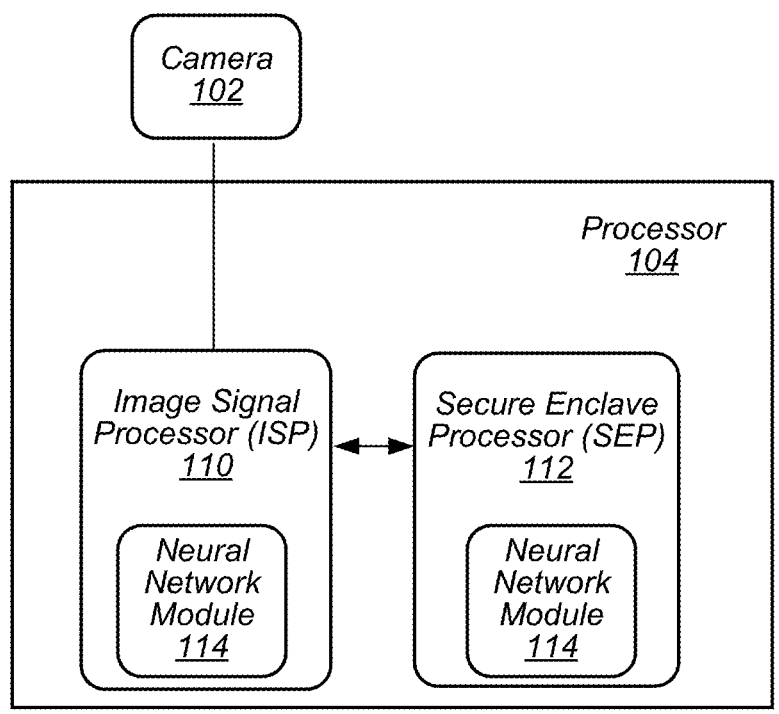
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

Figure 4:
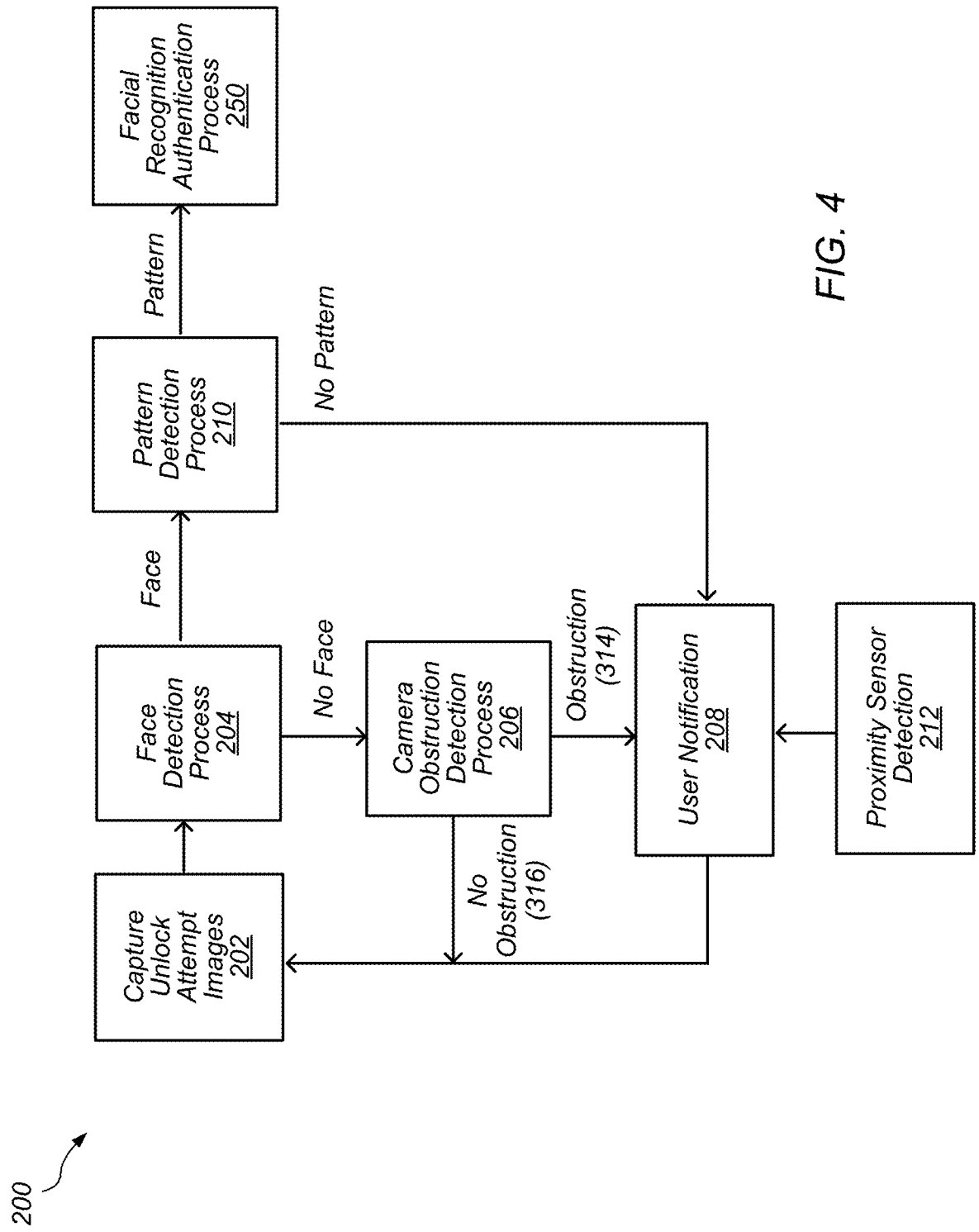
FIG. 4 depicts a flowchart of an embodiment of a facial recognition process.

FIG. 4 depicts a flowchart of an embodiment of facial recognition process 200. Process 200 may be used to authenticate a user as an authorized user of device 100 using facial recognition of the user. In certain embodiments, process 200 is used to authenticate a user using an enrollment profile (e.g., a template space generated during enrollment of the authorized user) on device 100. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 200 is used as a primary biometric authentication process for device 100 (after enrollment of the authorized user). In some embodiments, process 200 is used as an authentication process in addition to additional authentication processes (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 200.

In 202, camera 102 captures one or more images of the user attempting to be authenticated for access to device 100 (e.g., the camera captures one or more "unlock attempt" images of the user). Camera 102 may capture the unlock attempt images in response to a prompt by the user or a user generated request. For example, the unlock attempt image may be captured when the user attempts to access device 100 by pressing a button (e.g., a home button or virtual button) on device 100, by moving the device into a selected position relative to the user's face (e.g., the user moves the device such that the camera is pointed at the user's face or lifting the device from a table), and/or by making a specific gesture or movement with respect to the device (e.g., tapping on the screen, swiping the user's finger across the display, or picking the device off the table).

It is to be understood that, as described herein, unlock attempt images may include either flood IR images or patterned illumination images (e.g., images used to generate depth map images), or combinations thereof. The unlock attempt images captured in 202 may include a single image of the face of the user (e.g., a single flood IR image or single patterned illumination image) or the unlock attempt images may include a series of several images of the face of the user taken over a short period of time (e.g., one second or less). In some embodiments, the series of several images of the face of the user includes pairs of flood IR images and patterned illumination images (e.g., pairs of consecutive flood IR and patterned illumination images). In some implementations, the unlock attempt image may be a composite of several images of the user illuminated by the flood illuminator and the pattern illuminator.

After images are captured in 202, face detection process 204 may be used to determine and locate one or more faces in the captured images. In certain embodiments, face detection process 204 operates on a flood IR image captured in 202 (e.g., an image captured while the subject is illuminated with flood IR illumination). Face detection process 204 may include encoding an unlock attempt image (e.g., a flood IR image) to generate feature vectors for the image and assessing the generated feature vectors to determine whether or not a face is present in the image. In some embodiments, output from face detection process 204 when a face is detected may include, but not be limited to, detection and position of the face in the image (which may be represented, for example, by a bounding box for the face in the image), a pose of the face (e.g., the pitch, yaw, and roll of the face in the bounding box), and a distance between the face and the camera. Examples of face detection processes are described in U.S.

patent application Ser. No. 15/910,551 to Gernoth et al. and U.S. Provisional Patent Application No. 62/679,850 to Kumar et al., which are incorporated by reference as if fully set forth herein.

Figure 5:
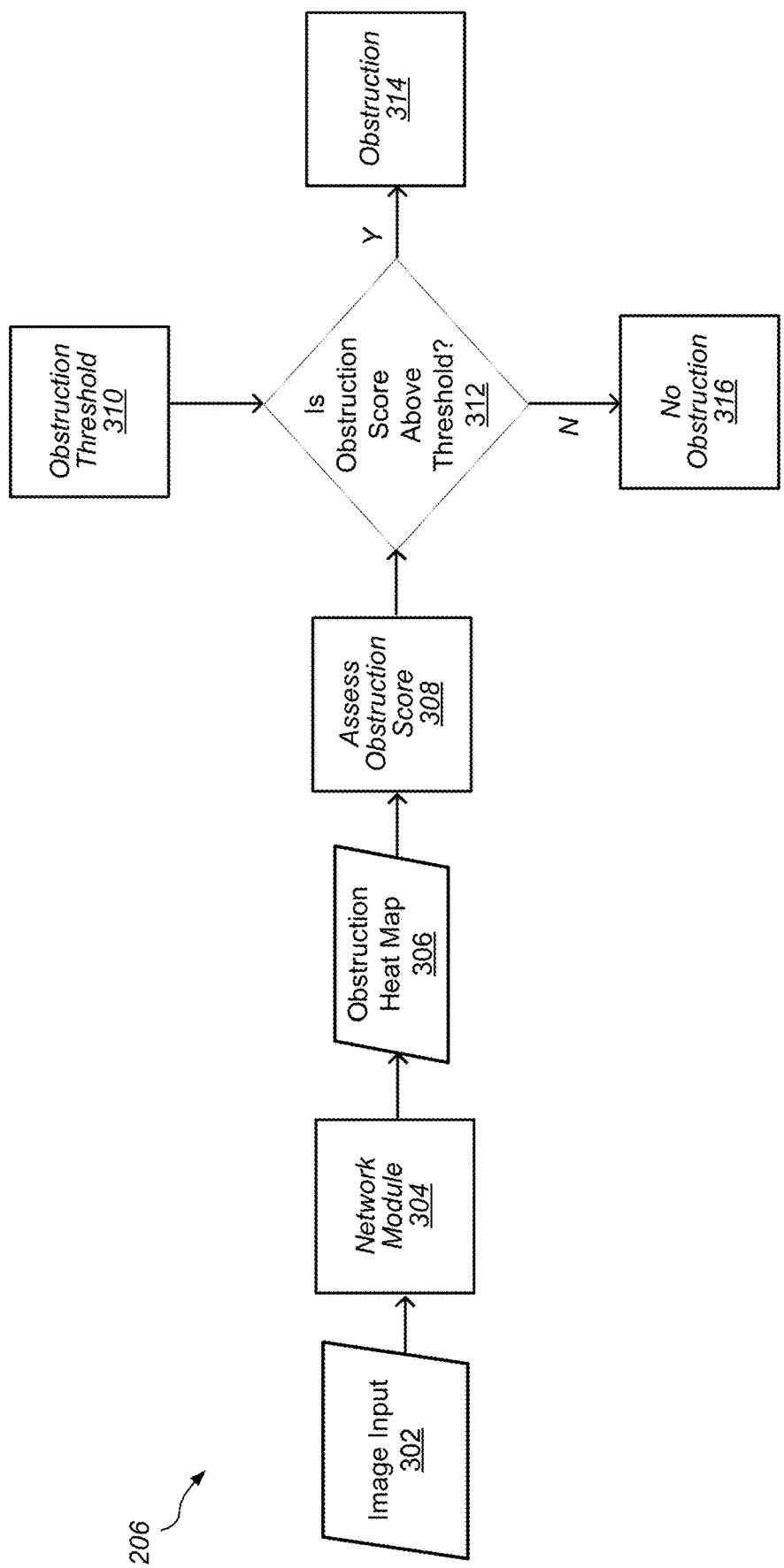
FIG. 5 depicts a flowchart of an embodiment of a camera obstruction detection process.

In certain embodiments, if no face is detected by face detection process 204, process 200 may continue with camera obstruction detection process 206. FIG. 5 depicts a flowchart of an embodiment of camera obstruction detection process 206. Camera obstruction detection process 206 may operate on a flood IR image. In certain embodiments, camera obstruction detection process 206 operates on the flood IR image operated on by face detection process 204.

In certain embodiments, the flood IR image is provided to camera obstruction detection process 206 as image input 302. Image input 302 may be a down scaled full frame flood IR image (e.g., down scaled from the original captured image). In some embodiments, image input 302 is a 128-pixel (e.g., 128×128) image. Image input 302 may be provided to network module 304. Network module 304 may process image input 302 to generate obstruction heat map 306. In certain embodiments, network module 304 is a neural network module. Network module 304 may include network circuitry installed or configured with operating parameters for producing obstruction heat maps. For example, network module 304 may be a network module using operating parameters generated from a training process. In some embodiments, the training process includes using training images labelled with opinions (e.g., yes/no opinions) on obstruction to generate operating parameters for the network circuitry. In some embodiments, the training process includes providing multiple opinions of a binary obstruction map on a grid (e.g., a 32×32 grid) to network module 304. Network module 304 may be trained to predict a ground-truth obstruction map using the provided opinions.

Network module 304 may generate obstruction heat map 306 as a high-level grid representation of image input 302. For example, network module 304 may generate obstruction heat map 306 as an n×n grid representation of image input 302 where n×n is a lower resolution (e.g., lower number of pixels) than the image input. Thus, obstruction heat map 306 may be an n×n grid of regions or cells representing input image 302. In one embodiment, obstruction heat map 306 is a 32×32 grid representation of image input 302, which is a 128×128 pixel image. In some embodiments, obstruction heat map 306 may be an asymmetrical grid representation of image input 302 (e.g., an m×n grid representation of the image input).

Figure 6:
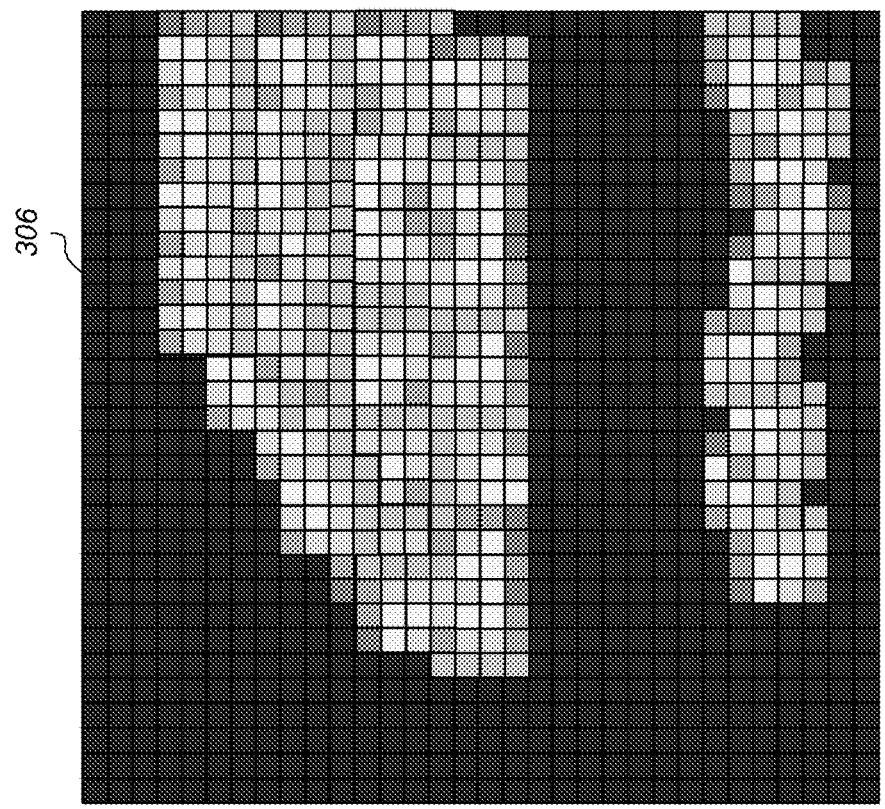
FIG. 6 depicts a representation of an embodiment of a grayscale image for an example of an obstruction heat map.

FIG. 6 depicts a representation of an embodiment of a grayscale image for an example of obstruction heat map 306. Obstruction heat map 306 may be a grid representation of image input 302 with each region (e.g., cell) having a value (e.g., a vector or number) that measures a probability of obstruction in that region as determined by network module 304. Obstruction heat map 306 may be displayed as the grayscale image with grayscale intensity representing different values of obstruction probabilities in the regions in the image.

As shown in FIG. 5, in 308, an obstruction score for image input 302 may be assessed using obstruction heat map 306. In certain embodiments, the obstruction score is determined by comparing the obstruction probabilities in each region against an obstruction threshold value to get a binary decision for each region in obstruction heat map 306. The obstruction threshold value may be determined using, for example, analysis of curves or optimization of obstruction data. The binary decision may be that either there is obstruction in the region if the obstruction probability is above the obstruction threshold value or there is no obstruction in the region if the obstruction probability is below the obstruction threshold value. In some embodiments, obstruction threshold values for the regions may be weighted based on location of the regions in the image. For example, lower obstruction threshold values may be used in regions closer to the center of the image as compared to regions closer to the edges of the image. Weighting the obstruction thresholds to have lower values near the center of the image may be more accurately assess obstruction that may be inhibiting detection of a face in the image (e.g., as more features used in face detection tend to be located nearer the center of the image).

Figure 7:
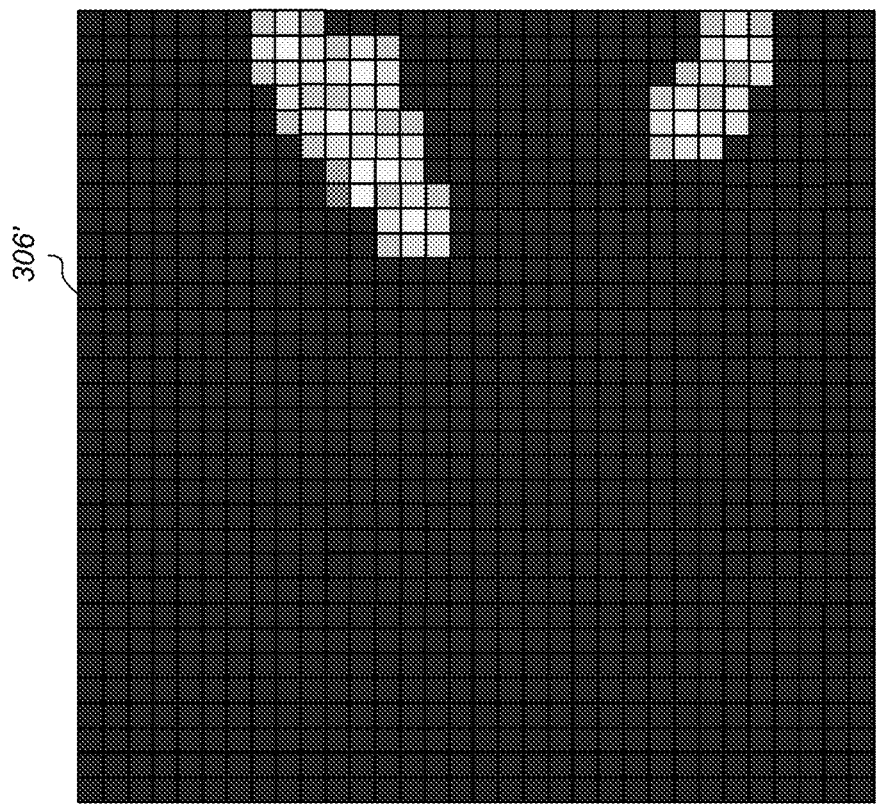
FIG. 7 depicts a representation of another embodiment of a grayscale image for another example of an obstruction heat map.

The obstruction score may then be obtained by counting the number of regions that have obstruction. For example, in the embodiment depicted in FIG. 6, if every non-dark region is assumed to have obstruction, there are then 442 regions with obstruction out of 1024 total regions and the obstruction score would be 43.16%. Thus, for the embodiment depicted in FIG. 6, about 43% of the field of view in image input 302 is obstructed. FIG. 7 depicts a representation of another embodiment of a grayscale image for another example of obstruction heat map 306'. In the embodiment depicted in FIG. 7, there are 67 regions with obstruction and the obstruction score would be 6.5%. In some embodiments, the regions may be weighted based on location of the regions in the image. For example, regions near the center of the image may be given more weight towards the overall obstruction score than regions near the edge of the image (e.g., regions near center may be weighted to be 1.5× regions along the edges of the image). Varying the weights of the regions to determine the overall obstruction score may provide similar advantages to weighting the obstruction thresholds as described above.

As shown in FIG. 5, the obstruction score is compared to threshold 310 in 312. Threshold 310 may be a minimum value of obstruction in an image (e.g., image input 302) needed for objects in the image to be considered as obstructed. Threshold 310 may be selected or determined, for example, based on image obstruction data. In 312, if the obstruction score is above threshold 310, then camera obstruction detection process 206 may output that there is obstruction in 314. Alternatively, in 312, if the obstruction score is below threshold 310, then camera obstruction detection process 206 may output that there is no obstruction in 316.

In some embodiments, threshold 310 may be set at 30% (e.g., 30% of the field of view in the image is obstructed). Other values for threshold 310 may also be contemplated (e.g., 25%, 35%, 40%, etc.). With a value of 30% used for threshold 310 and using the obstruction heat map examples depicted in FIGS. 6 and 7, obstruction heat map 306 would be determined to have obstruction (obstruction score of 43.16%) and obstruction heat map 306' would be determined to not have obstruction (obstruction score of 6.5%).

In some embodiments, after the binary decisions are made that there is either obstruction in each region or no obstruction in each region of obstruction heat map 306 (e.g., based on the obstruction probability for each region being above or below the obstruction threshold value as described above), assessing the obstruction score in 308 may include assessing obstruction scores for subsections of the obstruction heat map. For example, the obstruction heat map may be divided into a selected number of subsections (e.g., 4 subsections) (it should be noted that the obstruction heat map may be divided into the subsections before or after the binary decisions on the regions are made). An individual obstruction score for each subsection may then be determined for each of the subsections of obstruction heat map 306. The individual obstruction scores for each subsection may be compared to an obstruction threshold (e.g., threshold 310) to determine whether there is obstruction or not in each subsection. The image may then be determined to be obstructed (e.g., have obstruction) if at least a selected number of the subsections (e.g., at least half the subsections) are determined to be obstructed.

In some embodiments, obstruction for an image may be determined using a combination of the individual obstructions scores for the subsections and the overall obstruction score for the entire (whole) image (e.g., the obstruction score obtained by counting the number of regions in the entire image that have obstruction, as described above). For example, obstruction for the image may be determined based on a combination of at least some number of the subsections having an obstruction score above a threshold for the subsections (e.g., at least half the subsections having an obstruction score above the threshold) and the overall obstruction score being above a threshold for overall obstruction (e.g., threshold 310).

In some embodiments, process 200, shown in FIG. 4, operates on multiple image frames. For example, face detection process 204 may operate on multiple flood IR images captured in 202. In such embodiments, camera obstruction detection process 206, shown in FIG. 5, may be operated if a face is not detected in all of the image frames (e.g., in all the captured flood IR images). Camera obstruction detection process 206 may then assess an obstruction score for each image frame individually. The individual obstruction scores may then be averaged to determine an overall obstruction score that is compared to threshold 310 for a decision on obstruction in the images. If a face is detected in any of the image frames, process 200 may continue with pattern detection process 210, as shown in FIG. 4 and described below.

In certain embodiments of process 200, if obstruction is determined by obstruction camera obstruction detection process 206, then a notification to the user is provided in 208. The notification to the user may include, for example, a notification on display 108 of device 100 and/or an audible notification. In some embodiments, the notification may prompt the user that there is an obstruction that needs to be removed. The obstruction notification may include information about the part of device that is obstructed. For example, if obstruction is determined by camera obstruction detection process 206, the user may be notified that camera 102 is obstructed. It should be noted that obstruction of flood illuminator 105A may also be detected by camera obstruction detection process 206. In certain embodiments, if no obstruction is determined by camera obstruction detection process 206, then process 200 restarts in 202 without any notification being provided to the user. If no notification is provided to the user, then process 200 may automatically restart without any user input.

Figure 8:
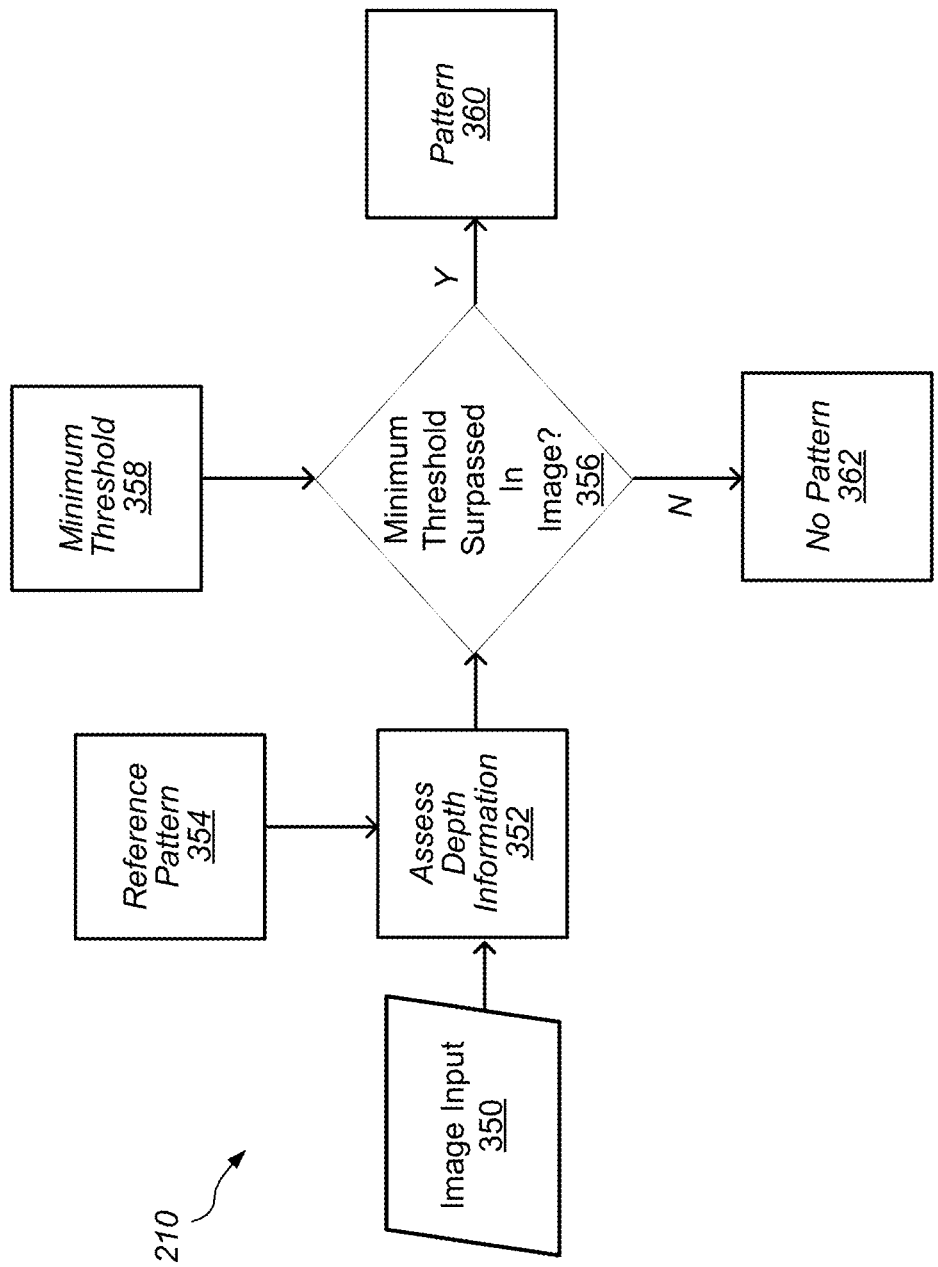
FIG. 8 depicts a flowchart of an embodiment of a pattern detection process.

In certain embodiments, as shown in FIG. 4, if a face is detected by face detection process 204 (e.g., a face is detected in any flood IR image captured in 202), process 200 continues with pattern detection process 210. FIG. 8 depicts a flowchart of an embodiment of pattern detection process 210. In certain embodiments, pattern detection process 210 operates on a patterned illumination image captured in 202 (e.g., an image captured while the subject is illuminated with patterned IR illumination (such as speckle pattern IR illumination)). In some embodiments, the patterned illumination image is captured along with the flood IR image (or images) before face detection process 204. In some embodiments, the patterned illumination image is captured after face detection process 204 detects a face in the flood IR image.

In certain embodiments, the patterned illumination image is provided to pattern detection process 210 as image input 350. The patterned illumination image may be a two-dimensional image with varying spacing between features (e.g., between the dots or speckles) in the image based on the features the illumination is projected on. In 352, the pattern detection process may attempt to assess depth information in the patterned illumination image. Depth information may be assessed by comparing the patterned illumination image to reference pattern 354. Reference pattern 354 may be a known configuration and dot pattern being generated by the pattern illuminator (e.g., illuminator 105B). Depths in the captured patterned illumination image may be interpolated by assessing spacing of the features (e.g., the dots or speckles) in the captured image in comparison to reference pattern 354.

In 356, the pattern detection process may assess if the depth information assessed in 352 surpasses minimum threshold 358 (e.g., a minimum amount of depth information is detected in image input 350). In some embodiments, minimum threshold 358 may be a minimum pattern needed in the patterned illumination image (image input 350) to properly assess depth map image data from the patterned illumination image. For example, minimum threshold 358 may be a minimum number of depth samples in the patterned illumination image that are needed to provide useable depth information from the image.

If the minimum threshold is met in 356, then the pattern detection process may output that a pattern is detected in 360. If the minimum threshold is not met in 356, then the pattern detection process may output that no pattern is detected in 362. In certain embodiments, the minimum threshold is not met by pattern detection process 210 when the pattern illuminator (e.g., illuminator 105B) is obstructed or blocked by an object (e.g., a user's finger or hand). Since a face has already been detected by face detection process 204, camera 102 may not obstructed or blocked from viewing the user's face in the captured image and thus, the lack of pattern detection may indicate that illuminator 105B is at least partially obstructed.

Figure 9:
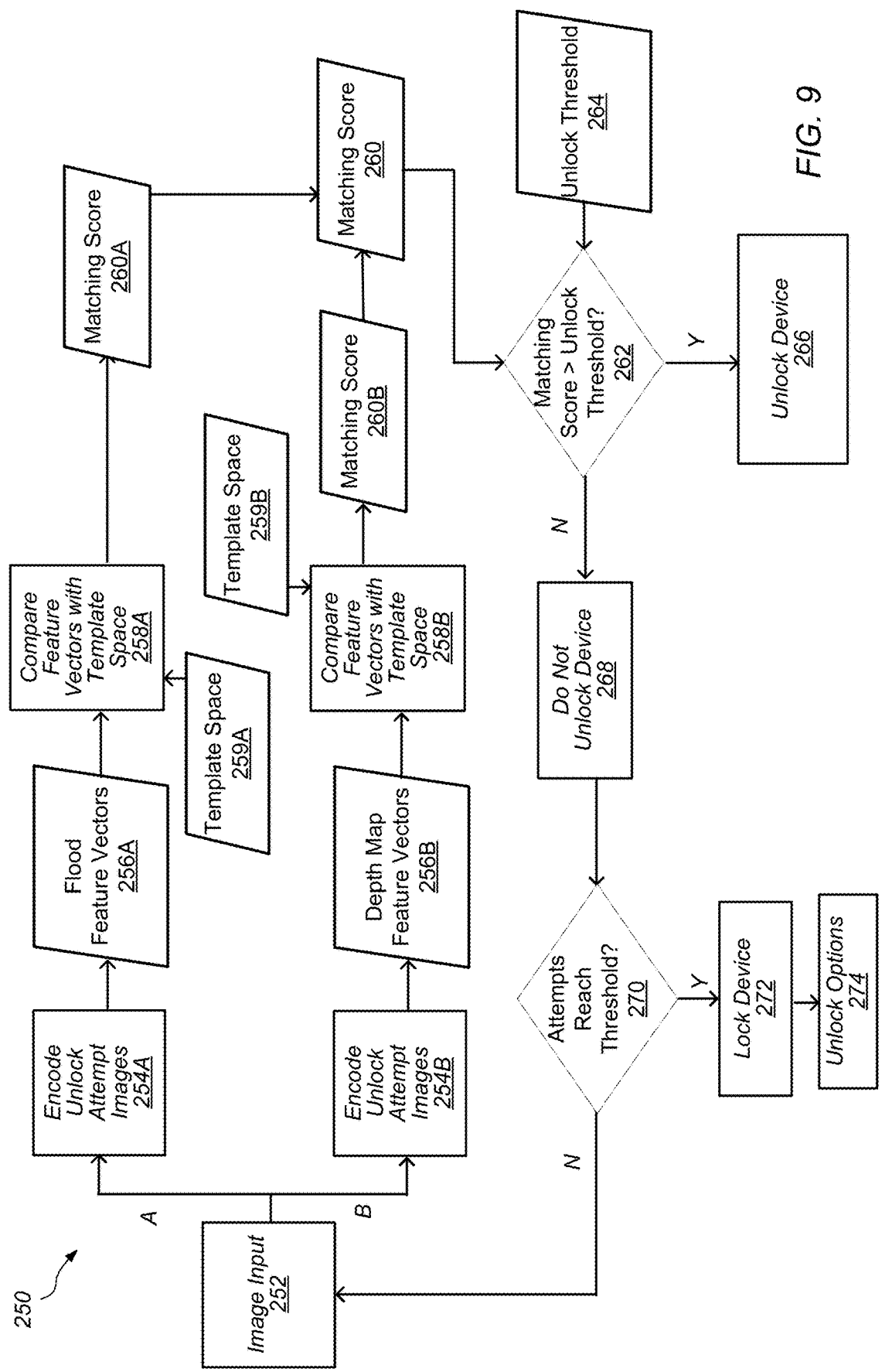
FIG. 9 depicts a flowchart of an embodiment of a facial recognition authentication process.

As shown in FIG. 4, in process 200, if the pattern is detected by pattern detection process 210, then process 200 continues with facial recognition authentication process 250, shown in FIG. 9. If the pattern is not detected by pattern detection process 210 (e.g., the minimum pattern is not detected), a user notification may be provided in 208. The user notification may include a notification on display 108 of device 100 and/or an audible notification. In some embodiments, the notification may notify the user that there is an obstruction that needs to be removed. The obstruction notification may include a notice that the area around the camera and/or the illuminator is obstructed. For example, if obstruction is determined by pattern detection process 210, the user may be notified that the illuminator is obstructed.

In certain embodiments, after the notification is provided in 208 (due to either camera obstruction detection process 206 or pattern detection process 210), process 200 may discard any unlock attempt images (e.g., images processed by face detection process 204, camera obstruction detection process 206, and/or pattern detection process 210) captured to that point. After discarding the unlock attempt images, process 200 may restart with the capturing of new unlock attempt images in 202. Process 200 may restart either automatically or after user input (e.g., after user acknowledgment of the notification).

In some embodiments, device 100 includes proximity sensor 107, as shown in FIG. 1. Proximity sensor 107 may be positioned close to, included as part of, camera 102 on device 100. Proximity sensor 107 may detect if an object (e.g., a user's face or hand) is near device 100. Proximity sensor 107 may detect objects within a close range to device 100. For example, proximity sensor 107 may detect objects that are within about 2 cm to about 3 cm of device 100.

As shown in FIG. 4, output from proximity sensor 107 may be provided as proximity sensor detection 212 in process 200. Proximity sensor detection output may be provided to user notification 208. In certain embodiments, user notification 208 includes notifying the user that an object is detected in proximity to device 100 (as detected by proximity sensor 107) and that the object needs to be moved for process 200 (e.g., the facial recognition process) to continue. In some embodiments, process 200 may be stopped when proximity sensor 107 detects an object in proximity to device 100.

As described herein, user notification 208 may include notifications resulting from camera obstruction detection process 206, pattern detection process 210, and/or proximity sensor detection 212. In some embodiments, user notification 208 may include providing combinations of notifications from these processes (e.g., multiple notifications from the individual processes). In some embodiments, user notification 208 may include providing a single notification following input that there is an obstruction from any one of these processes. For example, user notification 208 may be provided a simple notification that there is an object blocking device 100 from capturing images suitable for facial recognition. Providing notifications to the user that there is an obstruction of the device may provide a more satisfying user experience for the user. For example, notifying the user of an obstruction may provide feedback to the user that prevents the user becoming frustrated when the facial recognition process is not working correctly.

FIG. 9 depicts a flowchart of an embodiment of facial recognition authentication process 250. As shown in FIG. 4, facial recognition authentication process 250 may operate after a pattern is detected by pattern detection process 210. As described above, the unlock attempt images captured in 202, shown in FIG. 7, may include combinations of flood IR images and patterned illumination images (e.g., pairs of flood IR images and patterned illumination images). The unlock attempt images captured in 202 may be provided to facial recognition authentication process 250 as image input 252.

In certain embodiments, as shown in FIG. 9, flood IR images from the unlock attempt images captured in 202 are processed in association with a template corresponding to flood IR data (e.g., a template for flood IR enrollment images). Path "A" may be the path for flood IR images in process 250. Patterned illumination images generated from the unlock attempt images captured in 202 may be processed in association with a template corresponding to patterned illumination image data (e.g., a template for patterned illumination or depth map enrollment images). Path "B" may be the path for patterned illumination images in process 250.

In 254A, flood IR images from image input 252 are encoded to define flood (e.g., two-dimensional) the facial features of the user as one or more feature vectors in a feature space. Flood feature vectors 256A may be the output of the encoding of the flood IR images in 254A. Similarly, in 254B, patterned illumination images from image input 252 may be encoded to define the depth map (e.g., three-dimensional) facial features of the user as one or more feature vectors in a feature space. Depth map feature vectors 256B may be the output of the encoding of the patterned illumination images in 254B.

In certain embodiments, in 258A, flood feature vectors 256A are compared to feature vectors in the templates of flood IR template space 259A to get matching score 260A for the flood IR images. In 258B, depth map feature vectors 256B may be compared to feature vectors in the templates of depth map template space 259B to get matching score 260B for depth map image data in the unlock attempt images. In certain embodiments, flood IR template space 259A and depth map template space 259B include templates for an enrollment profile for an authorized user on device 100 (e.g., templates generated during an enrollment process). Matching score 260A may be a score of the differences between flood feature vectors 256A and feature vectors in flood IR template space 259A (e.g., flood feature vectors for the authorized user generated during the enrollment process). Matching score 260B may be a score of the differences between depth map feature vectors 256B and feature vectors in depth map template space 259B (e.g., depth map feature vectors for the authorized user generated during the enrollment process). Matching score 260A and/or matching score 260B may be higher when flood feature vectors 256A and/or depth map feature vectors 256B are closer to (e.g., the less distance or less differences) the feature vectors in flood IR template space 259A and/or depth map template space 259B.

In some embodiments, comparing feature vectors and templates from a template space to get a corresponding matching score includes using one or more classifiers or a classification-enabled network to classify and evaluate the differences between the generated feature vectors and feature vectors from the template space. Examples of different classifiers that may be used include, but are not limited to, linear, piecewise linear, nonlinear classifiers, support vector machines, and neural network classifiers. In some embodiments, matching score 260A and/or matching score 260B are assessed using distance scores between feature vectors (e.g., feature vectors 256A or feature vectors 256B) and templates from the template space (e.g., template space 259A or template space 259B, respectively).

In certain embodiments, matching score 260A and matching score 260B are combined to generated matching score 260. In some embodiments, matching score 260A and matching score 260B may be averaged to generate matching score 260 (e.g., each matching score 260A and 260B provides 50% of matching score 260). In some embodiments, matching score 260A is weighted to provide more contribution to matching score 260. In some embodiments, matching score 260A may be used as matching score 260. For example, matching score 260A may be used as matching score 260 if matching score 260A is above a threshold that provides a high confidence of matching between the user in the unlock attempt images and the authorized (e.g., enrolled) user.

In 262, matching score 260 is compared to unlock threshold 264 for device 100. Unlock threshold 264 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 264 may be a threshold value that determines whether the unlock feature vectors (e.g., feature vectors 256) are similar enough (e.g., close enough) to the templates associated with the authorized user's face (e.g., the templates in the template space). In certain embodiments, unlock threshold 264 is set during manufacturing and/or by the firmware of device 100. In some embodiments, unlock threshold 264 is updated (e.g., adjusted) by device 100 during operation of the device as described herein.

As shown in FIG. 7, in 262, if matching score 260 is above unlock threshold 264 (i.e., the user's face in the unlock attempt images substantially matches the face of the authorized user), the user in the unlock attempt images is authenticated as the authorized user for the enrollment profile on device 100 and the device is unlocked in 266. In certain embodiments, unlocking device 100 in 266 includes allowing the user to access and use the device (e.g., unlock the device) and/or allowing the user to have access to a selected functionality of the device (e.g., unlocking a function of an application running on the device, payment systems (i.e., making a payment), access to personal data, expanded view of notifications, etc.).

In 262, if matching score 260 is below unlock threshold 264 (e.g., not equal to or above the unlock threshold), then device 100 is not unlocked in 268 (e.g., the device remains locked). It should be noted that device 100 may be either locked or unlocked if matching score 260 is equal to unlock threshold 264 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 270. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 252) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 272. In some embodiments, when the device is locked in 272, an error message may be displayed (e.g., on display 108) indicating that facial recognition authentication process 250 (or process 200) has failed and/or the desired operation of device 100 is restricted or prevented from being performed. Device 100 may be locked from further attempts to use facial authentication in 272 for a specified period of time and/or until another authentication protocol is used to unlock the device. For example, unlock options 274 may include using another authentication protocol to unlock device 100.

Unlock options 274 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 274 may include, but not be limited to, using a passcode, a password, pattern entry, a different form of biometric authentication, or another authentication protocol to unlock device 100. In some embodiments, unlock options 274 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device.

If the unlock attempts are below the threshold in 270 (e.g., number of unlock attempts are below the maximum number of attempts allowed), then process 200 (shown in FIG. 4) may be run again (re-initiated) beginning with new unlock attempt images of the user being captured in 202. In some implementations, device 100 automatically captures the new unlock attempt image of the user's face without prompting the user (e.g., capturing of the new image is automatically implemented and/or hidden from the user). In some implementations, device 100 notifies the user (either visually and/or audibly) that process 200 is being re-initiated. In some embodiments, device 100 may prompt the user to provide input to re-initiate process 200. For example, the user may be prompted to acknowledge or otherwise confirm (either visually and/or audibly) the attempt to re-initiate process 200.

In certain embodiments, one or more process steps described herein may be performed by one or more processors (e.g., a computer processor) executing instructions stored on a non-transitory computer-readable medium. For example, facial recognition process 200, camera obstruction detection process 206, pattern detection process 210, and facial recognition authentication process 250, shown in FIGS. 4, 5, 8, and 9 may have one or more steps performed by one or more processors executing instructions stored as program instructions in a computer readable storage medium (e.g., a non-transitory computer readable storage medium).

Figure 10:
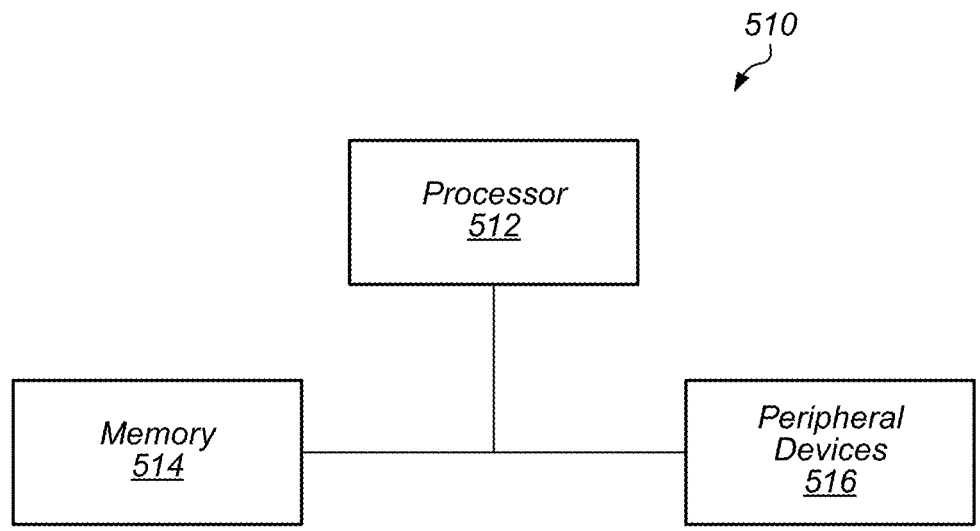
FIG. 10 depicts a block diagram of one embodiment of an exemplary computer system.

FIG. 10 depicts a block diagram of one embodiment of exemplary computer system 510. Exemplary computer system 510 may be used to implement one or more embodiments described herein. In some embodiments, computer system 510 is operable by a user to implement one or more embodiments described herein such as facial recognition process 200, camera obstruction detection process 206, pattern detection process 210, and facial recognition authentication process 250, shown in FIGS. 4, 5, 8, and 9. In the embodiment of FIG. 10, computer system 510 includes processor 512, memory 514, and various peripheral devices 516. Processor 512 is coupled to memory 514 and peripheral devices 516. Processor 512 is configured to execute instructions, including the instructions for facial recognition process 200, camera obstruction detection process 206, pattern detection process 210, and/or facial recognition authentication process 250, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 11:
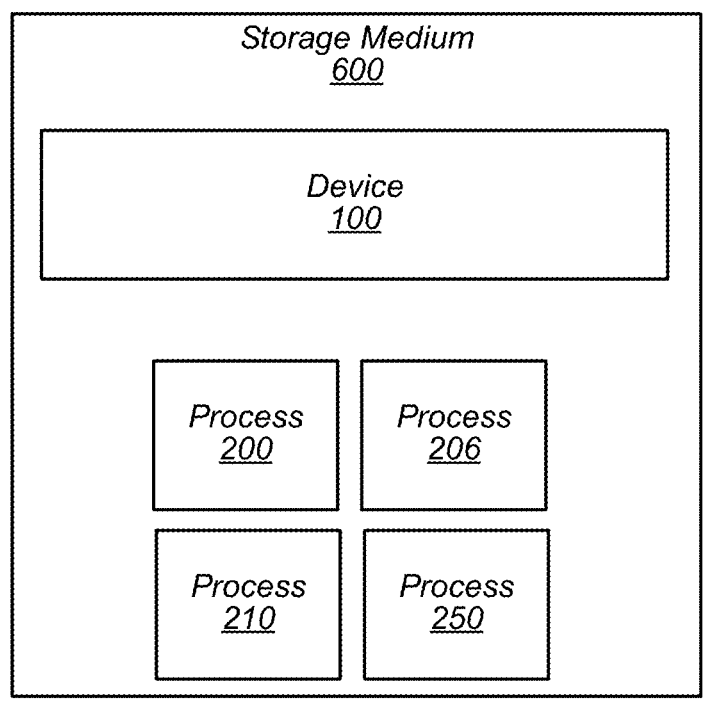
FIG. 11 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 11, other input/output (I/O) devices such as video hardware, audio hardware, user interface devices, networking hardware, etc.).

Turning now to FIG. 11, a block diagram of one embodiment of computer accessible storage medium 600 including one or more data structures representative of device 100 (depicted in FIG. 1) included in an integrated circuit design and one or more code sequences representative of facial recognition process 200, camera obstruction detection process 206, pattern detection process 210, and/or facial recognition authentication process 250 (shown in FIGS. 4, 5, 8, and 9). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or nonvolatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or nonvolatile.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
    capturing an image using a camera located on a device, the device comprising a computer processor and a memory, wherein the captured image comprises an image captured while illuminating with an illuminator located on the device; and
    assessing the captured image to determine whether a face is present in the captured image;
    in response to determining the face is not present in the captured image, the method further comprising:
        generating a low resolution image representation of the captured image, wherein the low resolution image representation is divided into a plurality of regions, and wherein a number of regions in the low resolution image representation is less than a number of pixels in the captured image;
        determining individual obstruction probabilities for individual regions in the low resolution image representation;
        assessing an overall obstruction score for the low resolution image representation from the determined individual obstruction probabilities for the individual regions; and
        in response to the overall obstruction score being above a predetermined threshold, providing a notification to the user that the device is obstructed.

2. The method of claim 1, wherein the overall obstruction score is assessed by:
    determining a number of regions having an individual obstruction probability above a predetermined value; and
    dividing the number of regions having the individual obstruction probability above the predetermined value by the number of regions in the low resolution image representation.

3. The method of claim 2, wherein the predetermined threshold comprises 30% of the number of regions in the low resolution image representation having the individual obstruction probability above the predetermined value.

4. The method of claim 1, wherein an individual obstruction probability for an individual region is a numeric value representation of a probability of obstruction in the individual region, the method further comprising determining the numeric value representations of obstruction probabilities for the individual regions in the low resolution image representation using a machine learning algorithm operating on the computer processor, wherein the machine learning algorithm has been trained to determine the numeric value representation in the individual regions.

5. The method of claim 1, wherein the notification to the user comprises at least one of a notification on a display of the device and an audible notification from the device that the device is obstructed.

6. The method of claim 1, further comprising capturing an additional image using the camera, and assessing the additional image to determine whether a face is present in the additional image after providing the notification to the user.

7. The method of claim 1, further comprising, in response to the overall obstruction score being below the predetermined threshold, capturing an additional image using the camera and assessing the additional image to determine whether a face is present in the additional image.

8. The method of claim 1, wherein assessing the captured image to determine whether the face is present in the captured image comprises:
    encoding the captured image to generate feature vectors for the captured image;
    assessing the feature vectors to detect a face in the captured image; and
    providing an output indicating that the face is present or is not present in the captured image.

9. A device, comprising:
    a camera;
    at least one illuminator providing infrared illumination;
    circuitry coupled to the camera and the illuminator, wherein the circuitry is configured to:
        capture an image using the camera, wherein the captured image comprises an image captured while illuminating with the illuminator providing infrared illumination;
        assess the captured image to determine whether a face is present in the captured image;
        wherein the circuitry is configured to, in response to determining the face is not present in the captured image:
            generate a low resolution image representation of the captured image, wherein the low resolution image representation is divided into a plurality of regions, and wherein a number of regions in the low resolution image representation is less than a number of pixels in the captured image;
            determine individual obstruction probabilities for individual regions in the low resolution image representation;

assess an overall obstruction score for the low resolution image representation from the determined individual obstruction probabilities for the individual regions; and in response to the overall obstruction score being above a predetermined threshold, provide a notification to the user that the device is obstructed.

10. The device of claim 9, wherein the at least one illuminator comprises a flood infrared illuminator.

11. The device of claim 9, wherein the device comprises a display, and wherein the notification to the user comprises a notification on the display of the device.

12. The device of claim 9, wherein the notification to the user comprises an audible notification from the device indicating that the device is obstructed.

13. The device of claim 9, further comprising a proximity sensor on the device, wherein the proximity sensor is configured to detect an object near the device, and wherein the circuitry is configured to provide the notification to the user in response to the proximity sensor detecting the object near the device.

14. A method, comprising:
capturing a first image using a camera located on a device, the device comprising a computer processor and a memory, wherein the first image comprises an image captured while illuminating with flood illumination from the device;
capturing a second image using the camera, wherein the second image comprises an image captured while illuminating with patterned illumination from the device;
assessing the first image to determine whether a face is present in the first image;
in response to determining the face is present in the first image:
assessing depth information in the second image; and
providing a notification to the user that the device is obstructed in response to the assessed depth information in the second image being below a minimum depth information threshold;

in response to the assessed depth information in the second image being above the minimum depth information threshold:
encoding the first image to generate at least one first feature vector, wherein the first feature vector represents one or more flood infrared facial features of the user in the first image;
encoding the second image to generate at least one second feature vector, wherein the second feature vector represents one of more depth map infrared facial features of the user in the second image;
comparing the first vector to one or more first reference templates stored in the memory of the device to obtain a first matching score;
comparing the second feature to one or more second reference templates stored in the memory of the device to obtain a second matching score;
assessing a third matching score from the first matching score and the second matching score; and
authorizing the user to perform the at least one operation on the device that requires authentication in response to the third matching score being above an unlock threshold.

15. The method of claim 14, wherein assessing depth information in the second image comprises comparing a pattern in the second image to a reference pattern for the patterned illumination provided from the device.

16. The method of claim 14, wherein the minimum depth information threshold comprises a minimum amount of depth information needed in the second image to assess features of the face in the second image.

17. The method of claim 14, wherein the notification to the user comprises a notification that an illuminator on the device is obstructed.

18. The method of claim 14, wherein the second image is captured in response to determining the face is present in the first image.

* * * * *

UNITED STATES PATENT AND TRADEMARK OFFICE
CERTIFICATE OF CORRECTION

PATENT NO. : 11,367,305 B2
APPLICATION NO. : 16/549009
DATED : June 21, 2022
INVENTOR(S) : Touraj Tajbakhsh et al.

It is certified that error appears in the above-identified patent and that said Letters Patent is hereby corrected as shown below:

In the Claims

Column 20, Line 22, delete "representation" and insert --representations--.

Column 22, Line 10, delete "one of" and insert --one or--.

Column 22, Line 15, delete "second feature" and insert --second feature vector--.

Signed and Sealed this
Twenty-seventh Day of June, 2023

*Katherine Kelly Vidal*

Katherine Kelly Vidal
*Director of the United States Patent and Trademark Office*